UNITED STATES PATENT OFFICE.

GUSTAV SCHWARZWALD, OF NEW YORK, N. Y., ASSIGNOR TO CAROLINE SCHWARZWALD, OF SAME PLACE.

COMPOSITION OF MATTER FOR PENCILS OR CRAYONS.

SPECIFICATION forming part of Letters Patent No. 471,438, dated March 22, 1892.

Application filed October 28, 1890. Serial No. 369,574. (No specimens.)

*To all whom it may concern:*

Be it known that I, GUSTAV SCHWARZWALD, a citizen of the United States, residing at New York, in the county and State of New York, have invented a certain new and useful Composition of Matter for Pencils and Crayons, of which the following is a specification.

My invention has for its object to manufacture pencils and crayons leaving marks of a metallic luster, so as to produce the natural colors of gold, silver, copper, and other metals, the marks being entirely water-proof. For this purpose I produce a composition to be used as cores for the pencils and crayons, which is made in the following manner: Paraffine-wax is mixed with a small quantity of oil, as benzine-oil, castor-oil, or turpentine, and with dammar-gum. Then bichromate of potassium is added thereto, which latter imparts to the ingredients aforesaid a yellowish color. Furthermore, copper or gold bronze powder is added, and all ingredients intimately mixed. To the mass thus obtained I add a certain quantity of naphthol, which prevents the fermentation of the mass and forms, together with the paraffine-wax, the binding medium of the same, so as to impart to the mass a certain consistency. The oil may be omitted, as it is not absolutely necessary. If pencils having a silver luster are to be made, the bichromate of potassium is omitted, and instead of the gold or copper bronze powder silver-bronze powder is used.

To diminish the cost of my pencils and to impart to the colors of the same lighter shades, finely-pulverized mica is added to the composition described, to which mica is imparted the color of the respective bronze by suitable dyeing materials. The mica thus prepared does not at all decrease the metallic luster of the marks made with the pencils.

In preparing the composition for my pencil and crayon cores the different ingredients are taken in the following proportions: to one hundred ounces of paraffine-wax two to ten ounces of dammar-gum, two ounces of bichromate of potassium, one hundred ounces of gold or copper bronze powder, and twenty-five ounces of naphthol are taken. Of course the paraffine-wax and the dammar-gum are used in a melted state. According to the color of the bronze-powder, one to ten ounces of pulverized mica is added. If desired, two ounces of oil may be given thereto, but the oil is not necessary, as aforesaid. The quantity of dammar-gum depends on the grade of hardness of the cores. In case silver-bronze powder is used the bichromate of potassium is omitted. All the ingredients are heated in a vessel and thoroughly mixed by stirring. Then the mass thus obtained is dried until it gets a certain consistency, and finally pressed in a mold, whereby to the same the shape of the cores is imparted. These cores are put into wooden or other sheaths or tubes, and the pencils and crayons are then ready for the market.

Having thus described my invention, I claim as new and desire to secure by Letters Patent—

1. A composition of matter for pencils and crayons, consisting of paraffine-wax, dammar-gum, naphthol, and bronze-powder, in the proportions described.

2. A composition of matter for pencils and crayons, consisting of paraffine-wax, dammar-gum, naphthol, bronze-powder, and bichromate of potassium, in the proportions specified.

3. A composition of matter for pencils and crayons, consisting of paraffine-wax, dammar-gum, naphthol, bronze-powder, bichromate of potassium, and pulverized mica, in the proportions specified.

In testimony whereof I have hereunto signed my name this 27th day of October, 1890.

GUSTAV SCHWARZWALD.

Witnesses:
EUGENE SWEENEY,
JNO. H. DONNEGAN.